(12) United States Patent
Frederiksen et al.

(10) Patent No.: US 8,891,460 B2
(45) Date of Patent: Nov. 18, 2014

(54) METHOD AND DEVICE FOR DATA PROCESSING IN A CELLULAR NETWORK

(75) Inventors: Frank Frederiksen, Klarup (DK); Klaus Ingemann Pedersen, Aalborg (DK); Vinh Van Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 102 days.

(21) Appl. No.: 13/061,977

(22) PCT Filed: Sep. 4, 2009

(86) PCT No.: PCT/EP2009/061447
§ 371 (c)(1),
(2), (4) Date: May 16, 2011

(87) PCT Pub. No.: WO2010/026210
PCT Pub. Date: Mar. 11, 2010

(65) Prior Publication Data
US 2011/0211543 A1 Sep. 1, 2011

(30) Foreign Application Priority Data
Sep. 4, 2008 (EP) .................................. 08105236

(51) Int. Cl.
*H04W 4/00* (2009.01)
*H04L 12/28* (2006.01)
*H04L 5/14* (2006.01)
*H04W 72/00* (2009.01)
*H04W 72/04* (2009.01)
*H04W 92/20* (2009.01)

(52) U.S. Cl.
CPC .......... *H04W 92/20* (2013.01); *H04W 72/0426* (2013.01)
USPC ........... 370/329; 370/254; 370/294; 370/338; 455/453

(58) Field of Classification Search
USPC ................... 370/254–258, 310–350; 455/453
See application file for complete search history.

(56) References Cited

U.S. PATENT DOCUMENTS

| | | | |
|---|---|---|---|
| 2006/0079242 A1* | 4/2006 | Vaittinen et al. | 455/453 |
| 2007/0165584 A1* | 7/2007 | Ponnampalam et al. | 370/338 |
| 2011/0096703 A1* | 4/2011 | Nentwig et al. | 370/294 |
| 2011/0110270 A1* | 5/2011 | Leng et al. | 370/254 |

FOREIGN PATENT DOCUMENTS

| | | |
|---|---|---|
| CN | 101132190 A | 2/2008 |
| CN | 101132643 A | 2/2008 |
| WO | WO 98/09390 | 3/1998 |

OTHER PUBLICATIONS

Kumar, S., et al., "Spectrum sharing for next generation wireless communication networks", Feb. 14, 2008, Abstract, 1 pg.

(Continued)

*Primary Examiner* — Jung Park
*Assistant Examiner* — Chuong M Nguyen
(74) *Attorney, Agent, or Firm* — Harrington & Smith

(57) ABSTRACT

Method and a device for data processing in a cellular network are provided, said method including the step of conveying signaling information between base stations over an air interface supporting SON and/or FSU in said cellular network. Furthermore, a communication system is suggested comprising said device.

8 Claims, 4 Drawing Sheets

(56) References Cited

OTHER PUBLICATIONS

3GPP TS 36.300 V8.5.0 (May 2008), "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 134 pgs.

3GPP TS 36.211 V8.3.0 (May 2008), "Generation Partnership Project; Technical Specification Group Radio Access Network; Evolved Universal Terrestrial Radio Access (E-UTRA); Physical Channels and Modulation (Release 8)", 79 pgs.

Kumar, S., et al., "Spectrum sharing for next generation wireless communication networks", Feb. 14, 2008,(5 pages).

* cited by examiner

Fig.2

| Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

METHOD AND DEVICE FOR DATA PROCESSING IN A CELLULAR NETWORK

The invention relates to a method and to a device for data processing in a cellular network and to a communication system comprising such a device.

3GPP Long Term Evolution (LTE) of UMTS, i.e., Release 9 and beyond—also referred to as LTE-Advanced (LTE-A)—as well as future advanced ITU International Mobile Telecommunications (IMT-A) systems in particular pursue an objective of supplying and supporting base stations or NodeBs (NBs) to the customers.

A challenging scenario is related to a local-area (LA) mass deployment of plug-and-play Home NBs (HNB) and/or Local-Area NBs (LNB) providing and/or coping with peak user bit rates of up to 1 Gb/s. It is in particular not clear as how self-organization networks (SONs) and flexible spectrum use (FSU) can be appropriately provided and/or efficiently supported.

SON techniques enable plug-and-play operation of the HNB and/or the LNB, self-tuning and reconfiguration of certain network parameters and structures affecting network operation. FSU techniques provide effective means of utilizing and sharing limited available spectrum resources among network systems of the same or of different operators processing an overlapping or even a common spectrum throughout a geographical service area.

In current LTE E-UTRAN Release 8, NB-to-NB communications required for supporting limited aspects of SON and FSU, such as self-optimization and inter-cell interference control (ICIC), are conducted over wired X2 interfaces. No solution is suggested regarding FSU and SON in combination with plug-and-play NBs and spectrum sharing (SS) between different operators' in the same service area.

The problem to be solved is to overcome the disadvantages stated above and in particular to enable in-band NB-to-NB broadcast control signaling over the air interface supporting SON and/or FSU in advanced cellular systems, in particular in 3GPP LTE Release 9 systems. It is noted that this approach is also backward compatible in particular with regard to Release 8.

This problem is solved according to the features of the independent claims. Further embodiments result from the depending claims.

In order to overcome this problem, a method is provided for data processing in a cellular network, comprising the step:
  conveying signaling information between base stations over an air interface supporting SON and/or FSU in said cellular network.

Advantageously, the signaling information can either be conveyed directly between base stations or it can be conveyed via a mobile terminal utilizing in particular a special channel for such purpose.

This approach efficiently enables base stations, in particular NBs (LNBs and/or HNBs) to become aware of interference and disturbances that may stem from other base stations and hence they may configure the cellular network accordingly to avoid or at least reduce detrimental effects from other base stations.

The approach further avoids that plug-and-play NBs affect the macro cellular network and hence avoid re-configuration of the macro cellular network based on the deployment of HNBs or LNBs.

The method for data processing may in particular comprise or provide a channel structuring and/or channel configuration function.

It is also an approach that said signaling information is conveyed and facilitated between base stations over the air interface.

In an embodiment, the signaling information comprises a broadcast control signaling information.

In another embodiment, said signaling information is supplied via a cell specific uplink broadcast channel (CUBCH).

In a further embodiment, said cell specific uplink broadcast channel is transmitted by at least one mobile terminal to convey signaling information to at least one adjacent base station.

It is noted that mobile terminal as well as the base station or NB (also eNB) may refer to any kind of communication network or technology present or upcoming.

In a next embodiment, the cell specific uplink broadcast channel is configured and/or controlled by a base station.

Hence, a particular base station (or several base stations) can be selected to control and/or configure said CUBCH.

It is also an embodiment that the cell specific uplink broadcast channel is scrambled by a cell-specific scrambling sequence.

Pursuant to another embodiment, a layer-1 cell ID of a particular base station is mapped to the cell specific uplink broadcast channel transport format and/or allocation.

According to an embodiment, the cell specific uplink broadcast channel configuration comprises at least one of the following:
  a transport format;
  a transmit power;
  a content;
  a schedule.

According to another embodiment, the method comprises the steps:
  the cell specific uplink broadcast channel configuration is conveyed and/or updated towards at least one mobile terminal;
  the at least one mobile terminal reconstructs and/or conducts cell specific uplink broadcast channel transmissions based on the configuration received.

In yet another embodiment, physical resources are reserved in the cellular network for said cell specific uplink broadcast channel.

According to a next embodiment, cell specific uplink broadcast channel configuration and/or control can be provided via layer-1 signaling and/or layer-2 signaling and/or layer-3 signaling.

Pursuant to yet an embodiment, the signaling information is received by a base station in a disruptive time interval (in particular: DNBO time interval).

This DNBO time interval can be used as an alternative to aforementioned CUBCH. However, it may also be used in combination with such Cell Specific Uplink Broadcast Channel.

According to an embodiment, the SFN can be set at the base stations for scheduling broadcast information in a coordinated manner among neighboring NBs.

It is a further embodiment that at least one base station indicates to at least one mobile terminal in a given cellular network an upcoming DNBO time interval. Such indication and/or notification can be provided utilizing a flag to be conveyed towards the at least one mobile terminal.

As another embodiment, said base station adjusts its cell configuration and/or its resource usage, in particular regarding SON and FSU, based on the signaling information received.

It is also an embodiment that a particular base station conveys signaling information in said disruptive time interval.

According to a further embodiment, at least some base stations send signaling information to each other utilizing at least one subframe.

The problem stated above is also solved by a device comprising a and/or being associated with a processor unit and/or a hard-wired circuit and/or a logic device that is arranged such that the method as described herein is executable on said processor unit.

According to an embodiment, the device is a communication device, in particular a or being associated with a base station (NB, LNB, HNB) or a mobile terminal (e.g., UE).

The problem stated supra is further solved by a communication system comprising the device as described herein.

Embodiments of the invention are shown and illustrated in view of the following figures:

FIG. 2 shows a table of uplink-downlink allocations according to Table 4.2-2 of 3GPP TS 36.211 V8.3.0 (2008-May) as agreed on for Release 8;

Figure 1:
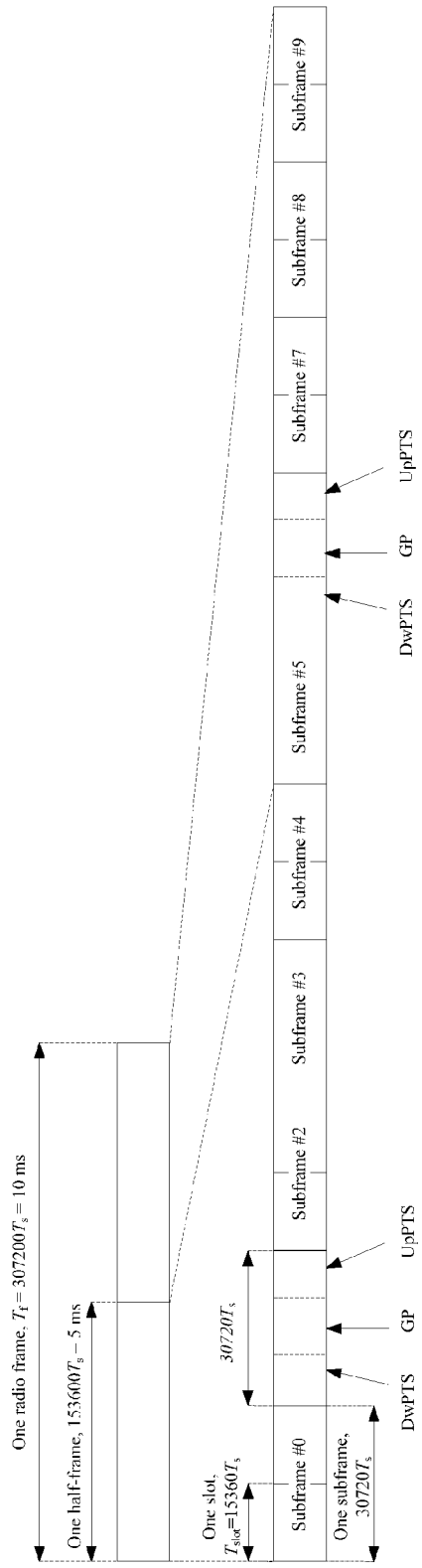
FIG. 1 shows a frame structure type 2 for a switch-point periodicity of 5 ms according to FIG. 4.2-1 of 3GPP TS 36.211 V8.3.0 (2008-May)

In a generic LA deployment scenario, several cellular networks of the same radio access technology (e.g., E-UTRA) operated by different operators are deployed in the same geographical area (e.g., in a modern house-and-office building complex) and make use of the same radio spectrum resources. HNBs or LNBs of the same or of different networks may be placed and set up next to each other within a short distance in a spatially uncoordinated fashion. An X2 direct interface between NBs as specified in E-UTRA Release 8 may be not applicable in such LA deployment scenario. Thus, technical issues or problems to be considered to facilitate efficient SON and FSU in supporting such LA deployment scenario may in particular comprise:

(a) An inter-cell and/or a co-channel interference may affect the operation of individual cells within the network. Interference is an important factor considering the plug-and-play nature of HNBs or LNBs and the lack of coordination between different networks and/or operators.

The plug-and-play scenario setting up HNBs and LNBs is totally different from traditional (offline) network-planning for existing cellular networks. Such cellular networks are also referred to as macro cells and are mostly set up offline carefully considering potential conflicts with other macro cells.

Initial setup, reconfiguration, reset or removal of plug-and-play HNBs or LNBs should only have a minimum impact on the operating network environment. Thus, any chain-reactions forcing are to be avoided that would lead to network reconfigurations across a number of (macro) cells of adjacent networks located around the said HNBs or LNBs. Hence, in other words, any plug-and-play HNB or LNB deployment preferably does not require to reconfigure existing macro-cells.

(b) There is a need for balancing a spectrum load among HNBs or LNBs which are active within a LA deployment. The spectrum is to be balanced in order to meet an efficient spectrum sharing and an overall efficient radio resource utilization. This is required by high dynamic variation and distribution of user traffic load among HNBs or LNBs stemming from a system requirement stipulating a high degree of spectral efficiency.

In general, coordination, either explicit or implicit, between adjacent NBs within one network system or between different network systems in terms of network planning, deployment arrangement, network configuration, real-time and non-real-time interaction and control are required for supporting efficient SON and FSU.

Implicit coordination, in which coordination information is not communicated explicitly by signaling messages, but inferred from a local environment, may be utilized for SONs. In case of limited cooperation between collocated network systems of different operators and/or in case of no direct X2 interface being available between NBs, a pragmatic approach to address the technical issues and problems mentioned above is to enable and use a particular NB sensing radio environment and adjacent NB-to-NB communication over the air interface. However, such approach leaves the topic unsolved as how to coordinate and schedule such NB-to-NB transmissions so that a given active NB can listen to other active NB(s) nearby while maintaining cell specific operation for local UEs.

The approach presented in particular considers applications of NB-to-NB signaling over an air interface, e.g., a NB broadcasting control information to other NBs in the neighborhood for facilitating and supporting SON and FSU. This is based on the principle of an active NB (e.g., HNB or LNB) broadcasting, e.g., certain cell-specific configuration, neighborhood knowledge and spectrum load status information to its adjacent NBs. Such information (e.g., notification, messages or indications) is preferably utilized by these adjacent NBs to determine, select or adjust proper spectrum resources to be used upon cell initial setup, reset, reconfiguration, or scheduling for actual users regarding adjacent networks that provide SON and/or FSU functionality.

A new NB upon its insertion into the network system or upon its reactivation (i.e., upon initial cell setup and reset) may listen to broadcast information of active NBs in its neighborhood. However, providing active NBs broadcast information and receiving broadcasted information from other active NBs during network operation results in practical and technical challenges: Firstly, regular active radio devices such as NBs are most probably not able to transmit and receive at the same time in the same frequency band or even to transmit and receive at the same time in different frequency bands that are not sufficiently spaced from each other. Secondly, utilizing an out-band broadcast control signaling is rather expensive in terms of spectrum consumption and NB implementation.

The approach presented in particular provides some methods and mechanisms to enable in-band NB-to-NB broadcast control signaling over the air interface supporting SON and FSU in advanced cellular systems, in particular in 3GPP LTE Release 9 systems. It is noted that this approach is also backward compatible in particular with regard to Release 8.

It is noted that for Release 8 backward compatibility considerations of Release 9, the following aspects of Release 8 structures may be considered:

(a) Release 8 frame structures for FDD and TDD, FDD UL-DL timing, TDD UL-DL allocations and channel structures as specified in 3GPP TS 36.211;
(b) TDD may be preferably utilized over FDD for LA scenarios;
(c) FIG. 1 shows a frame structure type 2 for a switch-point periodicity of 5 ms according to FIG. 4.2-1 of 3GPP TS 36.211 V8.3.0 (2008-May). FIG. 2 shows a table of uplink-downlink allocations according to Table 4.2-2 of 3GPP TS 36.211 V8.3.0 (2008-May) as agreed on for Release 8; Release 8 TDD assumes perfect time-synchronization and the same uplink-downlink configuration is applied for all NBs in a certain geographical area. This assumption may change for LTE-A. For instance, subframe #3, #4, #7, #8 can be used for either UL or DL on a frame-to-frame basis, which implies that for LTE-A there may be scenarios with uplink-downlink interference between NBs as well as between UEs.
(d) A physical broadcast channel (PBCH) carries the coded BCH transport block MIB (Master Information Block) mapped to four subframes within a 40 ms interval, i.e., the MIB is refreshed every 40 ms and repeated every 10 ms in subframe #0 within a 40 ms interval. The rest of broadcast system information is sent on a physical downlink shared channel (PDSCH). More related details can be found in 3GPP TS 36.300 V8.5.0 (2008-June).
(e) The scheduling information, as contained within SU-1, is carried in a System Information Block (SIB) called a Scheduling Block (SB). Besides this SB, SU-1 comprises one or more other SIBs. SU-1 may in particular comprise all access restriction related parameters. SU-1 is carried on a downlink shared channel (DL-SCH) and may use a fixed schedule with a periodicity of 80 ms. SU-1 is scheduled in the subframe #5. The updating schedule of a given SIB in current E-UTRAN follows a generic rule of SFN mod K=0, i.e., sent once every K system frames of 10 ms, with K=4, 8, 16, 32, etc. More related details can be found in 3GPP TS 36.300 V8.5.0 (2008-June).

The approach provided herein in particular allows, enables or facilitates in-band adjacent NB-to-NB broadcast control signaling over an air interface supporting SON and FSU, e.g., in advanced cellular systems.

Cell Specific Uplink Broadcast Channel (CUBCH)

This alternative is proposed primarily for LA TDD systems, but it is as well applicable for FDD systems.

The approach is based on one or several active UEs in a given cell broadcasting cell-specific information of interests to neighboring cells on a Cell Specific Uplink Broadcast Channel (CUBCH). This channel is preferably configured and controlled by a NB, but the channel itself is transmitted by selected active UE(s) in the cell using a particular format and/or allocation (e.g., in subframe #2 shown in FIG. 2, which can be commonly used for all NBs in a predetermined service area).

This CUBCH is intended to be received by all neighboring NBs. It is noted that in LA TDD systems a strict frame-synchronization as well as a close time-alignment among neighboring NBs and UEs can be expected. This is an excellent basis for operating the CUBCH.

Preferably, the CUBCH can be scrambled by a cell-specific scrambling sequence. It is preferable to have this sequence 1:1 mapped on a layer-1 (L1) cell ID of the cell (which is sent in DL synchronization channels), and thus CUBCHs of neighboring cells may be considered as quasi-orthogonal or semi-orthogonal.

The approach presented herein may utilize and/or provide a synchronization towards the neighboring NBs (also: eNBs).

It is also of advantage if the sequences used have sufficient correlation properties in the time domain as well as good cross correlation properties. In such case, synchronization efforts may be omitted. Sequences that could be used for this purpose could be so-called "Gold sequences" based on a Gold code constituting a set of binary sequences.

Preferably, neighboring NBs which have a valid L1 cell ID of a given cell (e.g., acquired upon initial setup or upon reactivation of the NB within its neighborhood or via an active UE measurement reports) may be able to receive the CUBCH. Hence, there may be a predefined 1:1 mapping between the L1 cell ID and the CUBCH transport format and allocation.

The CUBCH configurations comprise in particular a transport format, a transmit power, a content, and a schedule. Those are in particular controlled and updated towards (e.g., selected) active UE(s) in a given cell by the NB beforehand. Then, selected UE(s) may reconstruct and conduct actual CUBCH transmissions accordingly. The CUBCH may be pre-processed (e.g., parts of channel coding) by the NB.

The NB may select at least one suitable active UE to broadcast said CUBCH, to set and to control transmit power and contents of the CUBCH based on, e.g., monitored channel and traffic conditions, battery power status, location of the at least one active UE and the number of selected active UE(s) together with an awareness of adjacent NBs (e.g., their locations, radio ranges or sensitivities, etc.).

It is noted that in case more than one active UE is selected, preferably multiple synchronized CUBCH transmissions may provide for a significant diversity gain (also referred to as single-frequency-network gain). This diversity gain is achieved under the assumption that the propagation delay to neighboring eNBs can be estimated at a highly accurate level, or alternatively, a cyclic prefix is so long that it can capture the propagation delays. As some part of the diversity gain can also be obtained over time, a set of UEs transmitting the same CUBCH information could be perceived, but distributed over time, such that neighboring eNBs will be able to combine information provided by different UEs.

A solution to incorporate the CUBCH for FDD operation may be to reserve a set of physical resources in each cell, thereby ensuring that there will be no (significant) intra-cell interference from other UEs being scheduled. The reservation of resources could be defined in the frequency domain as well as in the time domain (for instance related to the system frame number).

Transmitting the CUBCH will require additional transmit power consumed by the UEs thereby reducing the endurance of the UEs' battery. This effect could be facilitated by providing benefits for these UEs like a reduced subscription price, a higher priority regarding data, etc.

The NB and the UE can use L1 (PHY), L2 (MAC) or L3 (RRC) signaling in order to facilitate CUBCH configuration and/or control.

This solution provides an additional channel (CUBCH) and related procedures to be implemented in Release 8. However, the solution does not change basic frame structures or system architectures of Release 8, thereby allowing the CUBCH to be added and integrated into Release 8 without any notable impacts on existing Release 8 system structures.

This approach is simple and effective, much faster and more robust than relying on, for examples, dedicated UE measurement and reporting of neighboring cells. This also improves the hidden node problem in case of direct NB-to-NB communication.

Figure 3:
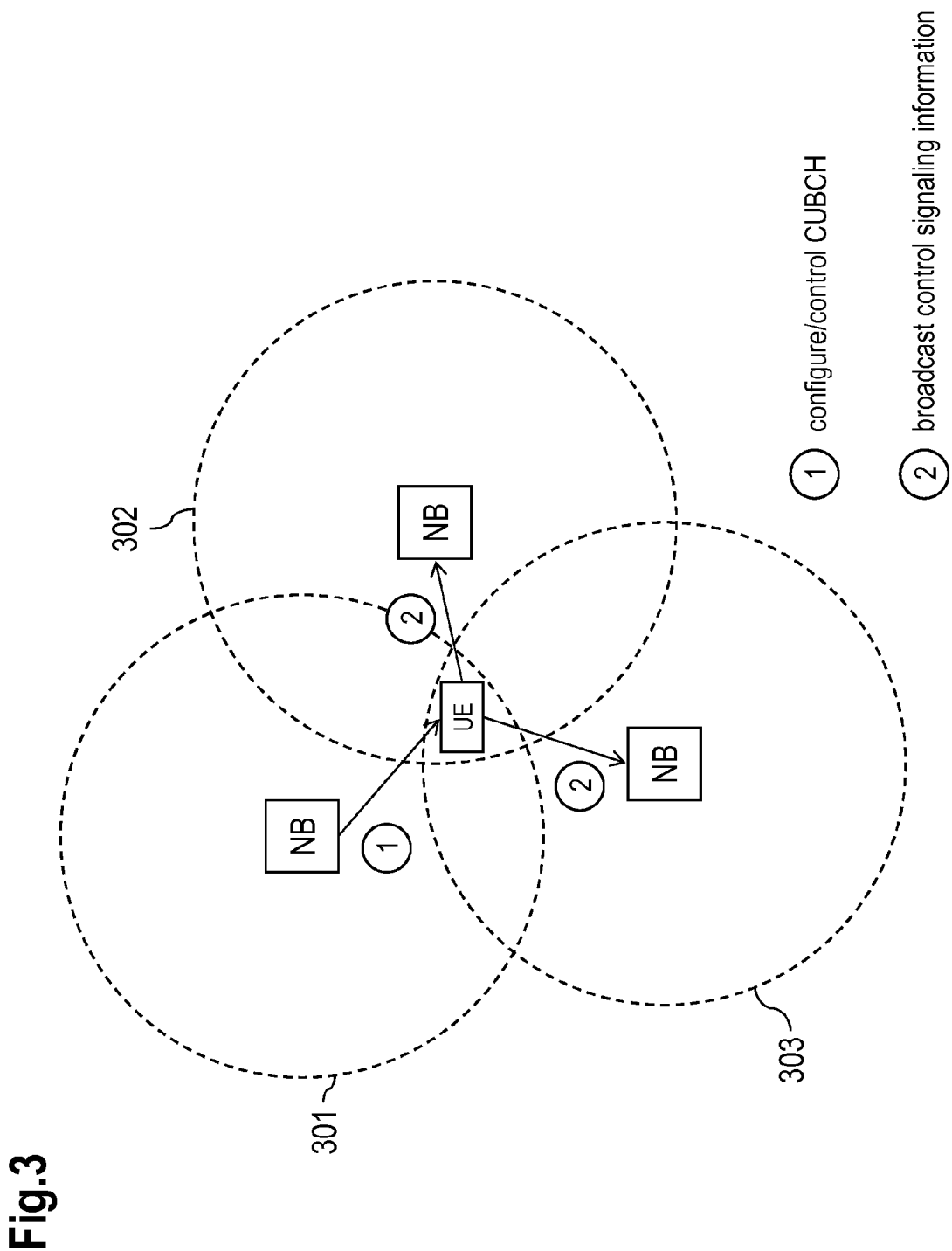
FIG. 3 shows a schematic network scenario comprising three NBs (e.g., HNBs and/or LNBs) each constituting a cellular network, wherein a mobile terminal is within range for all three cellular networks and a CUBCH is configured and controlled via a first NB and the mobile terminal conveys broadcast control signaling information via said CUBCH towards the remaining NBs.

FIG. 3 shows a schematic network scenario comprising three NBs (e.g., HNBs and/or LNBs) each constituting a cellular network 301 to 303. A mobile terminal UE is within range for all three cellular networks 301 to 303. A CUBCH is configured and controlled via NB of cellular network 301 and the mobile terminal conveys broadcast control signaling information via said CUBCH towards the NBs of cellular networks 302 and 303.

Disruptive NB Operation (DNBO) for Listening to Neighboring NBs

This solution is applicable for both, TDD and FDD systems.

It is based on the idea of coordinating transmissions of broadcast control signaling of interest between neighboring NBs and allowing a particular NB to temporarily interrupt or halt at least the current DL operation in certain frequency band of its cell for a Disruptive NB Operation DNBO time interval (e.g., in the order of tens of milliseconds) to listen to broadcast control signaling of neighboring NBs to adjust its cell configurations if necessary. Such adjustment may be required, e.g., in case the NB experiences some temporary local outage states.

The operation is resumed immediately after ending of the DNBO time interval. The UEs of the cell are informed prior to the actual DNBO so that the UEs can adjust their transmission timing accordingly. To realize this DNBO mode, the following topics may be at least partially considered:

(1) The NB, upon initial setup, reset and reconfiguration, may determine a proper SFN offset corresponding to a SFN information of most affected neighboring NBs. Such SFN information can be received, e.g., from BCH MIB of neighboring NBs.

It is noted that in current cellular systems such as Release 8 E-UTRAN, scheduling of SIB is tied to SFN mode K. This coordination of SFN may help in ensuring that most impacting neighboring NBs may (not) schedule SIB(s) of interest in the coinciding system frame. It may further prevent all those neighboring NBs from processing DNBO at the same time.

(2) Introducing a DNBO Indication Flag and a DNBO Interval to indicate an upcoming DNBO event: Prior to an event-triggered DNBO, the DNBO Indication Flag and the DNBO Interval can be sent to active UEs (in particular to all active UEs) in the cell on, e.g., a physical downlink control channel (PDCCH) in a broadcast fashion, or via a broadcast control channel.

The DNBO Interval can be a semi-static time interval that can be configured conveyed to the UEs utilizing SIBs. In case of periodical DNBOs, the semi-static DNBO schedule and the corresponding DNBO Interval can be sent via the BCH.

The duration of the DNBO Interval can be set to one or to multiple radio frames, preferably in a range of tens of milliseconds. However, the DNBO Interval may be configured to be sufficiently long for the NB to receive SIBs from other neighboring NBs while synchronization can be maintained and resumed.

(3) The NB in such DNBO mode may detect and listen to as many neighboring NBs as possible or it may just listen to a portion or a group of NBs selected.

The NB may also detect or determine other neighboring NB(s) currently being in DNBO mode, in particular if the NB does not receive information from those NB(s) as it would if they were not in DNBO mode.

Based on the received information and based on the detection regarding the NB's neighborhood, the NB is enabled to provide predictive adjustments for its operations with SON and FSU.

Considering TDD system evolutions of E-UTRAN with dynamic uplink-downlink switching, it may be a special case to have all neighboring NBs broadcast SIB(s) to each other within at least one subframe. For example, subframes #3, #4, #7 or #8 may be utilized as depicted in FIG. 2. In such case, the NB that requires listening to other neighboring NBs within a next system frame, may switch to a listening mode or to UL in the corresponding subframe(s) of the next system frame. Thus, the DNBO Interval is reduced to one or to several subframes and active UEs may be informed within the same system frame. Such an alternative can be supported by TDD systems using different UL and/or DL frame configurations between NBs and/or different frame timing offsets. Regarding FDD, such approach may require additionally forced disruptive NB transmissions when receiving BCH from neighboring cells.

This option is robust and also extendable to support more advanced NB-to-NB handshaking and communications, including in-band relaying extensions (RN-to-NB communications).

Figure 4:
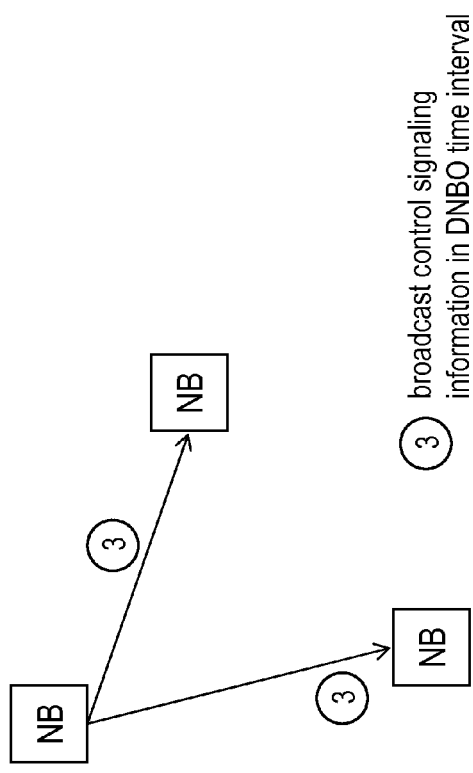
FIG. 4 shows a schematics comprising three NBs (HNBs and/or LNBs), wherein a first NB conveys broadcast control signal information in said DNBO time interval towards the other two NBs.

The second approach is visualized in FIG. 4 depicting a schematics comprising three NBs (HNBs and/or LNBs), wherein a first NB conveys broadcast control signal information in said DNBO time interval towards the other two NBs.

The approach presented in particular enables and facilitates exchange of control signaling over the air interface between access points (NB, HNB or LNB). Implementation of the proposed idea may refer to the access point and to the mobile terminal (UE).

LIST OF ABBREVIATIONS

3GPP 3rd Generation Partnership Project
BCH Broadcast channel
BCH Broadcast Channel
CUBCH Cell Specific Uplink Broadcast Channel
DL Downlink
DL-SCH Downlink Shared Channel
DNBO Disruptive NB Operation
E-UTRA Evolved UMTS Terrestrial Radio Access
eNB evolved NB
FDD Frequency Division Duplex
FSU Flexible Spectrum Use
HNB Home NB
IMT-A International Mobile Telecommunications—Advanced
L1 Layer 1 or Physical Layer
L2 Layer 2 (herein referred to, e.g., Medium Access Control Layer)
L3 Layer 3 (herein referred to, e.g., Radio Resource Control Layer)
LA Local Area
LNB LA NB
LTE Long Term Evolution
LTE-A LTE-Advanced
MIB Master Information Block
NB Node B or base station
PBCH Physical Broadcast Channel
PDCCH Physical Downlink Control Channel
PDSCH Physical Downlink Shared Channel
RAT Radio access technology
RN Relaying Node
SB Scheduling Block
SFN System Frame Number
SIB System Information Block
SON Self-Organization Network
SU-1 Scheduling Unit No. 1

TDD Time Division Duplex
UE User Equipment (Mobile Terminal)
UL Uplink
UMTS Universal Mobile Telecommunications System
UTRAN UMTS Terrestrial Radio Access Network

The invention claimed is:

1. A method for data processing in a cellular network, the method comprising:
arranging signaling information for a self-organized network (SON) or a flexible spectrum use (FSU) in a first base station of the cellular network; and
conveying the signaling information to at least one second base station over an air interface; wherein the signaling information is received by the at least one second base station in a frequency band after interrupting or halting downlink data transmission from said at least one second base station in the frequency band in a disruptive time interval.

2. The method according to claim 1, wherein said base station adjusts its cell configuration or its resource usage, in particular regarding SON and FSU, based on the signaling information received.

3. The method according to claim 1, wherein a particular base station conveys signaling information in said disruptive time interval.

4. The method according to claim 1, wherein at least some base stations send signaling information to each other utilizing at least one subframe.

5. An apparatus comprising one or more processors and one or more memories including computer program code, the one or more memories and the computer program code being configured, with the one or more processors, to cause the apparatus to perform at least the following:
arranging signaling information for a self-organized network (SON) or a flexible spectrum use (FSU) in a first base station of the cellular network; and
conveying the signaling information to at least one second base station over an air interface; wherein the signaling information is received by the at least one second base station in a frequency band after interrupting or halting downlink data transmission from said at least one second base station in the frequency band in a disruptive time interval.

6. The apparatus according to claim 5, wherein said apparatus is a communication device, in particular a base station or a mobile terminal, or being associated with a base station or a mobile terminal.

7. A communication system comprising base stations configured to execute the method according to claim 1.

8. A computer program product embodied on a non-transitory computer-readable medium and comprising program instructions which, when loaded into an apparatus, performs at least the following:
arranging signaling information for a self-organized network (SON) or a flexible spectrum use (FSU) in a first base station of the cellular network; and
conveying the signaling information to at least one second base station over an air interface; wherein the signaling information is received by the at least one second base station in a frequency band after interrupting or halting downlink data transmission from said at least one second base station in the frequency band in a disruptive time interval.

* * * * *